H. L. MERRICK.
WEIGHING MACHINE.
APPLICATION FILED MAY 5, 1914.

1,257,376.

Patented Feb. 26, 1918.
2 SHEETS—SHEET 2.

Witnesses:

Inventor
Herbert L. Merrick
By his Attorney

UNITED STATES PATENT OFFICE.

HERBERT L. MERRICK, OF PASSAIC, NEW JERSEY.

WEIGHING-MACHINE.

1,257,376.  Specification of Letters Patent.  Patented Feb. 26, 1918.

Application filed May 5, 1914. Serial No. 836,416.

*To all whom it may concern:*

Be it known that I, HERBERT L. MERRICK, a citizen of the United States of America, residing at Passaic, in the county of Passaic and State of New Jersey, have invented certain new and useful Improvements in Weighing-Machines, of which the following is a specification.

My invention relates to improvements in integrating mechanisms and more particularly to a mechanism adapted to integrate the weight of material being transported or carried on a moving vehicle as a continuous conveyer belt, or series of pans or buckets, or a plurality of units, such as cars entrained by a flexible connection.

In mechanisms of this character, the load carrying means passes while loaded over a depressible section the movements of which under the load of the vehicle and its contents, giving operative effect to an integrator and thus tending to register the gross weight of the same; and to insure the registration only of the net weight, the vehicle after the load is removed therefrom, is passed over a second depressible section coöperating with the other parts of the mechanism in a manner to modify the action of the integrator so as to register or integrate and register only the net load.

My present invention is aimed particularly to rectify the error arising from what may be termed the "tension load" or that load upon the depressible members due to the stresses longitudinally of the continuous flexible connection or belt through which movement is imparted to the load being carried.

Inasmuch as my invention can be best described and more readily understood in connection with a continuous belt conveyer as the load carrying vehicle. I have shown it in connection with an ordinary belt conveying mechanism, and will describe it more particularly with relation thereto.

In this type of conveying mechanism, the belt is in practice, placed under tension, and the integrating mechanism includes therein two idlers or sets of idlers depressible under the belt when loaded, and when empty, respectively, to control the action of the integrator in registering the net load. Heretofore it has been the usual practice to cause the idler depressible under the empty belt to act as a counterbalance to the idler depressible under the loaded belt, thus causing the integrator to register only the net load. By this practice, no correction of the error arising from variation in the "tension load" was secured or contemplated.

By my invention, I am not only enabled to secure an accurate registration of the net weight of the load as determined by deducting the total weight of the unloaded vehicle, from that of the loaded vehicle, but to automatically correct all error due to variation in the "tension load." Furthermore, I am enabled to balance or rebalance the mechanism because of a variance in the "tension load" either before the conveyer is loaded, or while it is in operation. A further characteristic of the invention resides in its adaptability to a construction wherein the balancing because of "tension load" variation, may be secured automatically if desired.

The invention consists primarily in an integrating mechanism embodying therein an integrator load carrying means, a depressible support for said load carrying means, connections between said support and said integrator, and means operative upon said integrator whereby error due to a variance of the tension load upon said support will be automatically corrected; and in such other novel features of construction and combination of parts as are hereinafter set forth and described, and more particularly pointed out in the claims hereto appended.

Referring to the drawings.

Like letters refer to like parts throughout the several views.

Figure 1:
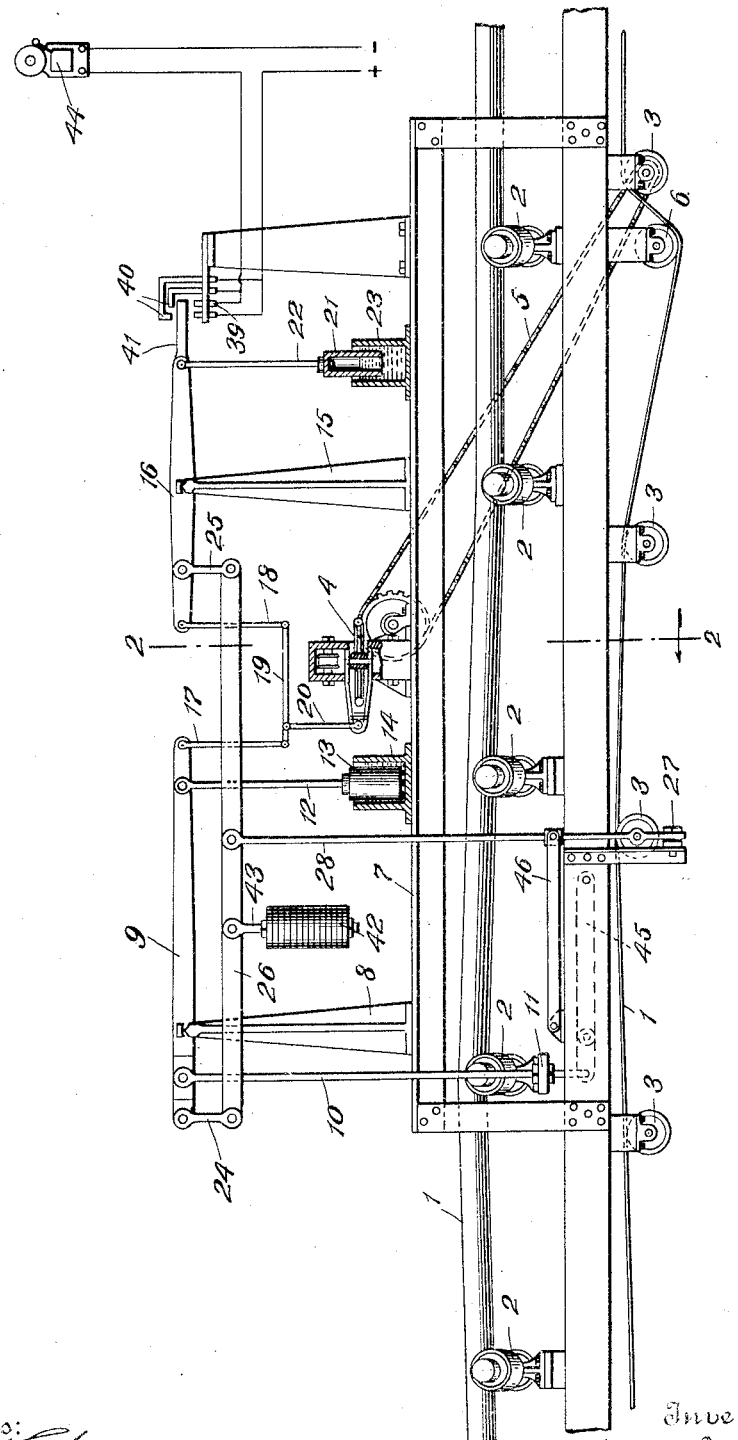
Figure 1 is a longitudinal elevation of the weighing section of a belt conveyer mechanism embodying my invention.

In the embodiment of my invention shown in the drawings, 1 indicates an endless flexible conveyer belt, the upper or load carrying reach or stretch of which is movable longitudinally thereof upon a plurality of troughing idlers 2—mounted upon the usual saddles 3, and the lower or return reach of which is movable upon the horizontal idlers 3. Only that portion of the conveyer mechanism adjacent the weighing mechanism is shown, as a further showing thereof is unnecessary to enable one skilled in the art to understand my invention.

Mounted adjacent any desired point of the conveyer mechanism is an integrator 4, of any desired or suitable type, which integrator is driven synchronously with the belt 1, or other load carrying vehicle, as by means of the chain and sprocket mechanism 5, driven from one of the idlers 3, a tightening collar 6 being used to insure the development of the desired driving power by the said belt. The form of integrator shown in the drawings is old and well known in this art, being described in Letters Patent No. 954,870 granted to me under date of April 12, 1910. It is not my intention to limit the invention, however, to any particular form of integrator.

A fixed platform 7, above the belt 1 carries pedestals 8 upon which is pivoted a weighing beam 9. One arm of the beam 9 is connected by the links 10 with a movable platform 11 upon which one or more sets of idlers 2 are secured, thus affording a depressible support for the load carrying vehicle (the belt 1) at that point.

The other arm of the beam 9 has pivotally connected therewith and centrally thereof a link 12, a mercury float 13 being suspended from said beam by means of said link. This float is partially submerged in mercury contained in the cylinder 14, and serves to retard the oscillatory movement of said beam in the manner described in my aforesaid Letters Patent.

The end of the beam 9 adjacent the mercury float is connected with the integrator 4 in the manner to be hereinafter described, which construction is employed in order to secure automatic correction of the error arising from the variance in the tension load upon the platform 11 or the idlers carried thereby.

Mounted upon the pedestal 15 by means of pivots parallel with those of the beam 9 is an auxiliary weighing beam 16, by means of which the balancing of the weighing mechanism for the tension load is secured and the error arising from a departure from this balance is corrected.

The adjacent ends of the beams 9 and 16 are connected with the integrator 4 by means of the links 17—18 one end of which respectively is pivotally connected with its beam and the other end of which is pivotally connected with a cross bar 19. This cross bar is connected to the integrator 4 by means of a link 20 pivotally connected with said bar and said integrator. The beam 16 is supported at a point adjacent the center thereof so as to be sufficiently sensitive to readily respond to the variance in the "tension load" upon the depressible idlers.

A mercury float 21 is suspended from the beam 16 adjacent that end thereof opposite to that carrying the link 18, by means of the link 22 pivotally connected with said beam. The float 21 operates in the cylinder 23 containing mercury. This mercury float and dash pot structure is similar to the float and dash pot 13—14 but of smaller dimensions.

Suspended from similar arms of the beams 9 and 16 by means of links 24 and 25 are the floating beams 26—one on each side of the said beams 9 and 16. One of the return idlers 3 is supported on a depressible platform 27 which in turn is suspended from the floating beam 26 by means of the links 28.

Figure 2:
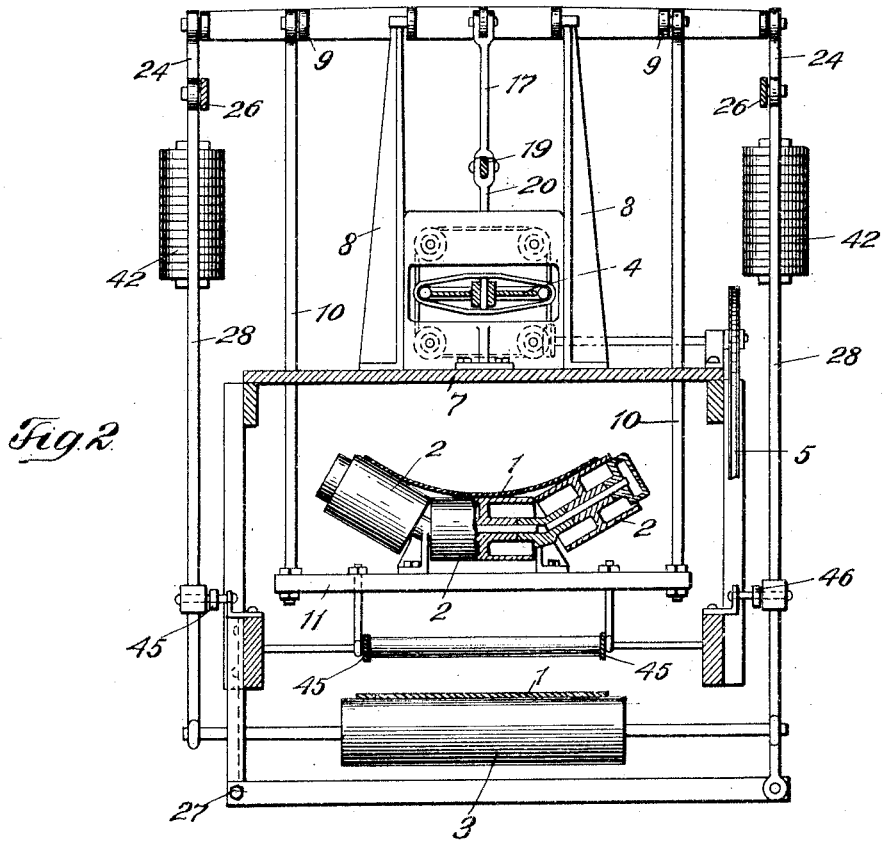
Fig. 2 is a transverse vertical section thereof on the line 2—2 of Fig. 1 with the automatic balancing mechanism removed therefrom and Fig. 3 is a view similar to Fig. 1 showing a modification in which the balancing for the "tension load" is secured by a manual adjustment of the mechanism.
Figure 3:
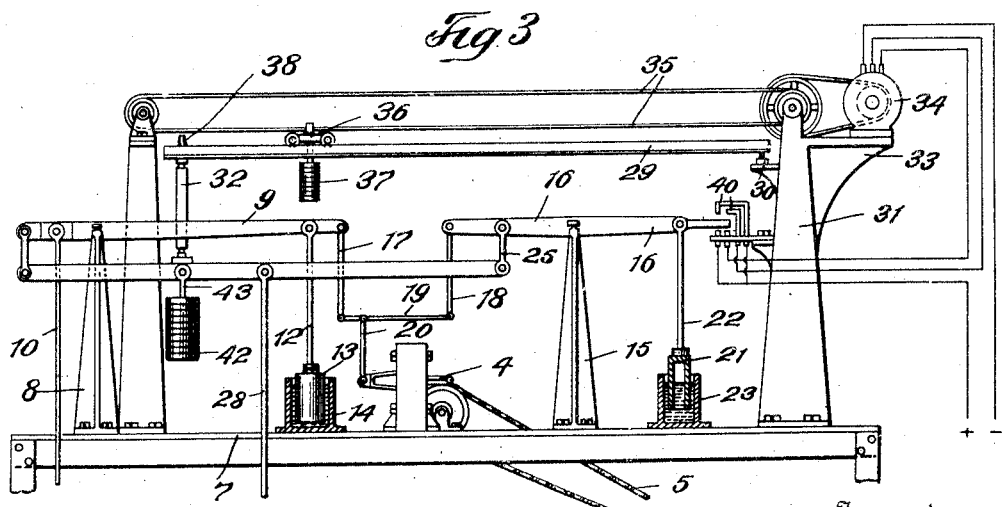

Acting upon the beam 26 is a counterpoise by means of which balancing for variation in the "tension load" or "torque load" is secured. The operative effect of the counterpoise may be automatically regulated as shown in Figs. 1 and 2, or if desired it may be manually regulated as shown in Fig. 3. It is merely essential that this counterpoise be capable of adjustment or regulation to vary the load upon the floating beam 27, to secure a proper balance of the beams 9 and 16 under the "tension load" upon the platforms 11 and 27.

The links 28 are pivotally connected with the floating beams 26 intermediate the points of connection thereof with the links 24—25, the counterpoise being operative upon said beam between said links 28 and the links 24.

In the preferred form of the invention, the counterpoise comprises the rails 29, one end of which is mounted upon a horizontal fulcrum 30 carried by the pedestal 31. The other end of said rails is supported from the floating beam 9 by means of the connecting support 32, upon which the rail is pivotally mounted.

Supported upon the bracket 33 on the pedestal 31 is an electric motor 34 by means of which the cable 35 is actuated. Mounted upon the rails 29 is the wheeled traveler 36 so connected with the cable 35 as to receive movement in either direction therefrom. Suspended from the traveler is the counterpoise weight 37 the movement of which toward or from the fulcrum point 30 will regulate the balancing load upon the beam 26. The stop 38 prevents the traveler 36 leaving the ends of the rails 29.

Adjacent one end of the auxiliary beam 16, are two oppositely disposed pairs of contacts 39—40, said beam being provided with a bridge contact piece 41 adapted to coöperate with either pair of contacts to close the circuit to the electric motor 34 when there is a loss of balance of the "tension load" upon the platforms 11 and 27.

In the form of the invention shown in Fig. 3, the automatically acting balancing mechanism is dispensed with, the counterpoise mechanism comprising a counterpoise weight 42 suspended by the link 43 from the floating beam 26. The arrangement of contacts 39—40 and bridge contact piece 41 heretofore described is used in this modification; but instead of controlling the circuit to a motor, they control it to a signal gong 44. In this form of the invention, the balancing for the "tension load" is secured by removing weights from, or placing additional weights upon, the link 43.

The oscillatory links 45—46 act upon the suspension links 10 and 28, to insure substantially vertical movement thereof and prevent the platform 11—27 having oscillatory movement.

To secure the most accurate results, it is desirable that the idlers 2 and 3 carried by the depressible platform 11 and 27 shall normally occupy a plane higher than the adjacent fixed idlers, as by this arrangement the loss of pressure or "tension load" will be directly proportional to the belt tension.

The operation of the herein described integrating mechanism is substantially as follows:—

If a slack belt 1 be used, there will be little or no "tension load" upon the platforms 11 and 27, when there is no load upon the belt. With a slack belt under load, however, the error due to variance in the "tension" or "torque load" is incapable of accurate calculation. As the belt is placed under tension, however, the platform 11 will be depressed in proportion to the tension under which the belt is placed, carrying with it the short arm of the beam 9 and actuating the integrator 4 in a manner to cause the tension load to be registered upon the dynamometer. With this movement of the beam 9, the floating beam 26 will have sufficient downward movement to relieve the depressible platform 27 of a portion of its load, or depress same to an extent disproportionate to the "tension load," or the load of the belt itself, thereon. Since the "tension load" upon the platform 27 is balanced by the mercury float mechanism 21—22—23, the loss of the load upon the said platform will be balanced by said float through the movement of the beam 16, thus destroying the normal balance for the "tension load" and causing the link 18, to impart further similar movement to the integrator 4. The "tension load" upon the platforms 11 and 27, however, will thus be balanced although at the cost of a two-fold introduction of error in the integrator 4. To correct this error in the integrator without disturbing the balance thus secured, I add to the counterpoise weights 37 or 42 until the floating beam 26 is brought to a horizontal position, restoring both beams 9 and 16 to a balance and bring the integrator 4 to a neutral or inoperative position. The pivotal connection of the opposite ends of the floating beam 26 with the beams 9 and 16, and the connection of said beams 9 and 16 with the integrator and each other, insures such a distribution of the load upon said floating beam as to secure this result.

A balance for the normal or "tension load" having been thus secured, the mechanism is in condition to have the belt operated under a working load, and when under such a load, the error arising from the variance in the tension load will be corrected by this balancing mechanism in the manner hereinafter referred to.

It will be apparent that when a working load is upon a belt under tension that there will be a tendency of the belt to sustain the load, or partially sustain the load independently of the idlers 2 upon the depressible platform 11, and that this tendency will vary with variance in the weight of the working load. Hence error will be introduced into the weighing mechanism represented by a loss in the registered weight proportionate to resistance of the tensioned belt to displacement under this load. Hence with the depression of the platform 11 under the loaded belt, this platform will be relieved, in part at least, of the tension load, and the integrator 4 will be actuated to an extent represented by the working load less a part of the "tension load" thus destroying the balance for the "tension load" and registering short weight.

As the beam 9 oscillates under the control of the depressible platform 11, the floating beam 26 is lowered also, thus having a tendency to depress the platform 27, relieving it of at least a part of the "tension load" thereon, and increase the error by a still further loss of the balance for the "tension load," with a proportionate increase in the error in the integrator.

This tendency, however, as well as the actual error in the operative effect of the beam 9 is corrected by the auxiliary beam 16 and its appurtenance.

Any loss of the "tension load" upon the platform 27 is immediately compensated for by the action of the float 21 upon the beam 16. Immediately upon the development of any tendency toward a depression of the platform 27 excepting under the return stretch or reach of the belt 1, the end of the beam 16 connected with the link 18 will rise to an extent proportionate to the decrease in the load upon the platform 27, thus acting upon the integrator 4 through the links 18 and 20, and cross bar 19, and imparting to the link 17 an additional upward movement corresponding with that previous loss of movement due to the variance in the "tension load" upon the platform 11. If there should be an actual increase in the weight of the return reach of the belt 1 because of adhesion of part of the load to the belt or from any other cause, this additional weight would modify the action of the beam 16 in a degree to cause an actuation of the integrator under the control of said beam to a lesser extent determined by the added load upon the platform 27 represented by such increased weight of the belt over the normal weight thereof.

The balancing and rebalancing because of variance in the "tension load" is entirely automatic and is continuous irrespective of constant variance in the working load, upon the belt; in the tension load due to the working load or the "torque" of the driving means for the belt; and in the weight of the return stretch or reach of the belt.

Any loss in the normal balance for the "tension load" due to stretch of the belt, slippage of the tensioning idlers or any cause, will immediately result in excessive movement of the beam 16 with a resultant closing of the circuit through the contacts 39 or 40 and the bridge contact 41. In the preferred form of the invention, the closing of the circuit will actuate the motor 34 to impart movement to the traveler 36 and its counterpoise weight 37, toward or from the fulcrum point 30 until the circuit is opened and the balance is restored.

In the modification shown in Fig. 3, the closing of the circuit will sound the alarm signal 44, and the operator must then remove weights from or add them to the counterpoise weight 42 until the circuit is opened and the balance is restored.

It is apparent that the mechanism herein described will operate to correct error arising from variance in the "tension load" whether the preponderating cause of the error is found at the depressible platform 11, or at the depressible platform 27.

It is not my intention to limit myself to the precise details of construction shown in the accompanying drawings as it is apparent the proportion of the various parts, the points of pivotal connections and the various details are largely matters of design and calculation, and may be varied without departing from the spirit and scope of my invention.

I believe it to be broadly new to provide in an integrating mechanism of the character herein referred to, means for automatically correcting the error due to variance in the "tension load," and I intend to claim such broadly.

In using the term "tension load" I mean that tendency of a belt under tension to depress a depressible idler or platform, or to resist displacement under a working load.

Having described my invention what I claim as new and desire to have protected by Letters Patent is:—

1. An integrating mechanism embodying therein an integrator, flexible and tensional traveling load carrying means, a depressible support for, and subject to a load from said load carrying means, weighing means variably operative under the changing load, and tension load of said carrying means, whereby said load will be measured, balancing means operated from said weighing means whereby errors due to variance of the tension load upon said support will be automatically corrected, said weighing means including therein connections with said support and said integrator respectively, said balancing means including therein connections between said weighing means and said integrator respectively, a support for the unloading portion of said carrying means, and connections between said last named support and said balancing means.

2. An integrating mechanism embodying therein an integrator, flexible and tensional traveling load carrying means, a plurality of depressible supports adapted respectively to sustain loaded and unloaded portions of said means, said supports respectively being subjected to a tension load from said means, a weighing mechanism including therein operative connections between one of said supports and said integrator, balancing means including therein operative connections between said weighing means and said integrator and said support whereby errors due to variance in the tension load upon said support will be automatically corrected, a support for the unloaded portion of said carrying means, and connections between said last named support and said balancing means.

3. An integrating mechanism embodying therein an integrator, weighing means operatively connected with said integrator, flexible and tensional traveling load carrying means, supplemental weighing means also operatively connected with said integrator, operative connections between said weighing means and said supplemental weighing means, a counterpoise carried by said connections, a depressible support for the traveling load carrying means, said support being subjected to a tension load from said load carrying means, operative connections between said support and said weighing means whereby the latter will be actuated to determine the total load from said traveling load carrying means, means whereby said supplemental weighing means will be actuated through the tension load upon said support to correct errors of said weighing means due to variance of the tension load upon said support including therein a support for the unloaded portion of said carrying means, and connections between said support and said supplemental weighing means.

4. An integrating mechanism embodying therein an integrator, flexible and tensional traveling load carrying means, a plurality of depressible supports adapted respectively to sustain loaded and unloaded portions of said traveling load carrying means, said supports respectively being subject to a tension load from said means, a weighing mechanism operatively connected with that support which is adapted to sustain the loaded portion of said traveling means and said integrator, a supplemental weighing mechanism operatively connected with said integrator, means operatively connected to both said weighing mechanism, a counterpoise acting upon said last named means, means automatically varying the effective action of said counterpoise, and operative connections between the means connecting said first named weighing mechanism and said support for the unloaded portion of the load carrying means whereby said first named weighing mechanism will register the total load carried by said load carrying means and said supplemental weighing mechanism will correct error in said integrator due to variance of the tension load upon said supports.

5. An integrating mechanism embodying therein an integrator, flexible and tensional traveling load carrying means, a main weighing beam, a depressible support carried thereby and adapted to sustain a loaded portion of said means, an auxiliary weighing beam, a depressible support, adapted to sustain an unloaded portion of said means, said supports respectively being subjected to a tension load from said load carrying means, connections between said last named support and similar arms of both of said beams and connections between said weighing beams respectively and said integrator, whereby error due to variance of tension load upon said supports will be automatically corrected.

6. An integrating mechanism embodying therein an integrator, flexible and tensional traveling load carrying means, a main weighing beam, a depressible support carried thereby and adapted to sustain a loaded portion of said means, connections between said beam and said integrator, an auxiliary weighing beam, a depressible support adapted to sustain an unloaded portion of said means, said supports respectively being subject to a tension load from said load carrying means, connections between said last named support and similar arms of both of said beams, and a variable counterpoise weight acting on said last named connections whereby the tension load on said supports may be balanced.

7. An integrating mechanism embodying therein an integrator, flexible and tensional traveling load carrying means, a main weighing beam, a depressible support carried thereby and adapted to sustain a loaded portion of said means, an auxiliary weighing beam, a depressible support adapted to sustain an unloaded portion of said means, said supports respectively being subjected to a tension load from said load carrying means, connections between said last named support and similar arms of both of said beams, connections between said weighing beams respectively and said integrator whereby error due to variance of the tension load upon said supports will be automatically corrected, and a variable counterpoise weight acting on the connection between the support for an unloaded portion of the load carrying means, whereby the tension load on said supports respectively may be balanced.

8. An integrating mechanism embodying therein an integrator, flexible and tensional traveling load carrying means, a main weighing beam, a depressible support carried by one arm of said beam, and adapted to sustain a loaded portion of said means, an auxiliary weighing beam, a floating beam pivotally connected to that arm of said main beam carrying said depressible support and to a similar arm of said auxiliary beam, a depressible support adapted to sustain an unloaded portion of said load carrying means, said supports respectively being subjected to a tension load from said load carrying means, connections between said last named support and said floating beam, and connections between said weighing beams respectively and said integrator, whereby error due to variance of the tension load upon said supports will be automatically corrected.

9. An integrating mechanism embodying therein an integrator, flexible and tensional traveling load carrying means, a main weighing beam, a depressible support carried by one arm of said beam and adapted to sustain a loaded portion of said means, an auxiliary weighing beam, a floating beam pivotally connected to that arm of said main beam carrying said depressible support and to a similar arm of said auxiliary beam, a depressible support adapted to sustain an unloaded portion of said load carrying means, said supports respectively being subjected to a tension load from said load carrying means, connections between said last named support and said floating beam, a variable weight acting upon said floating beam whereby the tension load on said supports may be balanced and connections between said weighing beams respectively and said integrator whereby error due to variance of the tension load on said supports will be automatically corrected.

10. An integrating mechanism embodying therein an integrator, flexible and tensional traveling load carrying means, a main weighing beam, a depressible support carried by one arm of said beam, and adapted to sustain a loaded portion of said means, an auxiliary weighing beam, a floating beam pivotally connected to that arm of said main beam carrying said depressible support and to a similar arm of said auxiliary beam, a depressible support adapted to sustain an unloaded portion of said load carrying means, said supports respectively being subjected to a tension load from said load carrying means, connections between said last named support and said floating beam, a variable weight acting upon said floating beam whereby the tension load on said supports may be balanced, means adapted to be controlled by the movements of said auxiliary beam whereby the operative effect of said weight upon said floating beam will be automatically regulated to preserve said balance, and connections between said weighing beams respectively and said integrator whereby error due to variance of the tension load on said supports will be automatically corrected.

11. An integrating mechanism embodying therein an integrator, flexible and tensional traveling load carrying means, a main weighing beam, a depressible support carried by one arm of said beam and adapted to sustain a loaded portion of said means, an auxiliary weighing beam, a floating beam pivotally connected to that arm of said main beam carrying said depressible support and to a similar arm of said auxiliary beam, a depressible support adapted to sustain an unloaded portion of said load carrying means, said supports respectively being subjected to a tension load from said load carrying means, connections between said last named support and said floating beam, a variable weight acting upon said floating beam whereby the tension load on said supports may be balanced, oppositely disposed pairs of electrical contacts adjacent one arm of said auxiliary beam, a circuit closer carried by said arm, an electroreceptive device included in the circuit controlled by said contacts, and connections between said weighing beams respectively and said integrator whereby error due to variance of the tension load on said supports will be automatically corrected.

12. An integrating mechanism embodying therein an integrator, flexible and tensional traveling load carrying means, a main weighing beam, a depressible support carried by one arm of said beam, and adapted to sustain a loaded portion of said means, an auxiliary weighing beam, a floating beam pivotally connected to that arm of said main beam carrying said depressible support and to a similar arm of said auxiliary beam, a depressible support adapted to sustain an unloaded portion of said load carrying means, said supports respectively being subjected to a tension load from said load carrying means, connections between said last named support and said floating beam, an oscillatory track one end of which acts upon said floating beam, a traveler movable upon said track, a variable counterpoise weight carried by said traveler, a cable connected with said traveler, an electric motor adapted to impart movement to said cable in either direction, a circuit to said motor including therein oppositely disposed pairs of electrical contacts adjacent one arm of said auxiliary beam, a circuit closer carried by said arm whereby said traveler will be automatically actuated to maintain the balance of said supports under the tension load, and connections between said weighing beams respectively and said integrator whereby error due to variance of the tension load, on said supports will be automatically corrected.

13. An integrating mechanism, embodying therein an integrator, flexible and tensional traveling load carrying means, a plurality of depressible supports capable of simultaneous similar movement under said load upon a load carrying means, said supports respectively being subject to a tension load from said load carrying means, and independent connections between said supports, respectively, and said integrator, whereby both of said supports will be adapted to have a similar and cumulative operative effect upon said integrator to automatically correct the error due to the variance of the tension load upon said supports.

In testimony whereof I have affixed my signature in presence of two witnesses.

HERBERT L. MERRICK.

Witnesses:
CLARICE FRANCK,
OTTO MUNK.